United States Patent
Feeser

(10) Patent No.: US 11,084,455 B2
(45) Date of Patent: Aug. 10, 2021

(54) FRONT STRUCTURE OF A MOTOR VEHICLE

(71) Applicant: Dr. Ing. h.c. F. Porsche Aktiengesellschaft, Stuttgart (DE)

(72) Inventor: Klaus Feeser, Vaihingen/Enz (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 113 days.

(21) Appl. No.: 16/528,708

(22) Filed: Aug. 1, 2019

(65) Prior Publication Data
US 2020/0039464 A1   Feb. 6, 2020

(30) Foreign Application Priority Data
Aug. 1, 2018  (DE) .................. 10 2018 118 622.3

(51) Int. Cl.
*B60R 21/34*   (2011.01)
(52) U.S. Cl.
CPC ........ B60R 21/34 (2013.01); *B60R 2021/343* (2013.01)
(58) Field of Classification Search
CPC ... B60R 21/34; B60R 2021/343; B60R 19/48; B62D 35/005
See application file for complete search history.

(56) References Cited

U.S. PATENT DOCUMENTS

| 6,394,512 B1* | 5/2002 | Schuster ................. B60R 19/12 293/118 |
| 2004/0174024 A1* | 9/2004 | Murata ................... B60R 19/18 293/109 |
| 2007/0182172 A1* | 8/2007 | Hasegawa ............... B60R 19/18 293/102 |
| 2007/0187958 A1* | 8/2007 | Bouchez ................. B60R 19/18 293/102 |
| 2008/0001433 A1* | 1/2008 | Noyori .................... B60R 19/12 296/187.04 |

(Continued)

FOREIGN PATENT DOCUMENTS

| DE | 10031374 A1 * | 1/2002 | .......... B62D 35/005 |
| DE | 10 2016 117 066 | 3/2017 | |

(Continued)

OTHER PUBLICATIONS

Machine Translation of JP2014034383 (Year: 2014).*

*Primary Examiner* — James A English
*Assistant Examiner* — Kurtis Nielson
(74) *Attorney, Agent, or Firm* — Gerald E. Hespos; Michael J. Porco; Matthew T. Hespos

(57) ABSTRACT

A front structure (1) of a motor vehicle has at least one supporting crossmember (2) and a front spoiler (3) that extend in the transverse direction of the motor vehicle. The front spoiler (3) has a front section (30) that is outside from the supporting crossmember (2). At least one deformation member (5) is arranged in an intermediate space (4) between the supporting crossmember (2) and the front spoiler (3) or is integral with the front spoiler (3). The front section (30) of the front spoiler (3) and the deformation member (5) are configured so that, in the case of a pedestrian collision, the front section (30) can be arched by the deformation member (5) that is supported on the supporting crossmember (2).

12 Claims, 5 Drawing Sheets

(56) References Cited

U.S. PATENT DOCUMENTS

| | | | | |
|---|---|---|---|---|
| 2008/0217937 A1* | 9/2008 | Noel | ........................ | B60R 21/34 |
| | | | | 293/133 |
| 2014/0028051 A1* | 1/2014 | Oota | ........................ | B60R 21/34 |
| | | | | 296/187.04 |
| 2015/0091328 A1* | 4/2015 | Pugh-Jones | ............. | B60R 19/52 |
| | | | | 296/187.04 |
| 2017/0088091 A1 | 3/2017 | Ginn et al. | | |
| 2018/0272986 A1* | 9/2018 | Sipido | ..................... | B60R 19/14 |

FOREIGN PATENT DOCUMENTS

| | | | | | |
|---|---|---|---|---|---|
| EP | 2666674 | A1 | * | 11/2013 | ............ B60R 19/12 |
| JP | 11208389 | A | * | 8/1999 | |
| JP | 2002337634 | A | * | 11/2002 | |
| JP | 2004203158 | A | * | 7/2004 | |
| JP | 2012051435 | A | * | 3/2012 | ........... B62D 35/005 |
| JP | 2014034383 | A | * | 2/2014 | |

\* cited by examiner

FRONT STRUCTURE OF A MOTOR VEHICLE

CROSS REFERENCE TO RELATED APPLICATION

This application claims priority under 35 USC 119 to German Patent Appl. No. 10 2018 118 622.3 filed on Aug. 1, 2018, the entire disclosure of which is incorporated herein by reference.

BACKGROUND

Field of the Invention

The invention relates to a front structure of a motor vehicle, comprising at least one supporting crossmember and a front spoiler that extend in the transverse direction of the motor vehicle. The front spoiler having a front section that extends to the outside from the supporting crossmember, and at least one deformation means that is arranged in an intermediate space between the supporting crossmember and the front spoiler or is configured integrally with the front spoiler.

Related Art

Structural measures that improve pedestrian protection and that reduce the risk of injury in the case of a collision play an important role in the development of motor vehicles. DE 10 2016 117 066 A1 discloses a motor vehicle with an extendable front spoiler. In the case of a collision of the motor vehicle with a pedestrian, the front spoiler can be extended from a retracted position so that its edge forms the lowermost point of the front structure and extends to its frontmost point in the vertical plane.

It is an object of the invention to provide a front structure of a motor vehicle with improved pedestrian protection.

SUMMARY

The invention relates to a front structure of a motor vehicle that includes a front spoiler. The front structure includes deformation means configured so that, in the case of a pedestrian collision, the front section can be arched by a deformation means that is supported on a supporting crossmember of the vehicle. The arching of the front section of the front spoiler on account of the force that acts in the case of a collision has the consequence that the front structure has a higher supporting plane as a result of the arched front section of the front spoiler. The higher supporting plane leads to improved pedestrian protection.

The supporting crossmember and the deformation means may have outer contours formed to correspond with one another in those sections in which they interact with one another by way of the support of the deformation means in the case of a pedestrian impact. As a result, the arching behavior of the front section of the front spoiler can be improved in the case of a collision. The adaptation of the outer contours of the supporting crossmember and the deformation means achieves a situation where the ratio of the deformation of the front section in the vehicle longitudinal direction (x-direction) to the widening in the vehicle vertical direction (z-direction) can be improved.

The outer contours of the supporting crossmember and the deformation means may be formed in a complementary manner with respect to one another at least in sections where they interact with one another in a pedestrian impact.

The outer contour of the supporting crossmember may be of substantially concave configuration at least in sections, and the outer contour of the deformation means may be of substantially convex configuration at least in sections. As a result, effective turning in of the deformation means can be achieved in the case of a collision for further improving the arching behavior of the front section of the front spoiler.

The front structure may have a holding device which is arranged between the supporting crossmember and the front section of the front spoiler. The holding device may hold an end of the deformation means that faces the supporting crossmember to achieve a secure retention of the deformation means.

The holding device may have a first and second holding elements that are spaced apart from one another in the vehicle vertical direction and a receiving space between the first and second holding elements may receive an end of the deformation means that faces the supporting crossmember. As a result, particularly secure retention of the deformation means can be achieved.

The two holding elements may be formed so that the receiving space tapers in the direction of the supporting crossmember. As a result, the retention of the deformation means in the receiving opening can be improved, and improved guidance of the deformation means in the case of a collision can be achieved.

The deformation means may be substantially planar in that region, in which the deformation means faces the front section of the front spoiler after the pedestrian impact. As a result, particularly effective support of the front section of the front spoiler on the deformation means can be achieved in the case of a collision.

At least one deformation means may be an articulated structure with one or more joints that are integral with the front spoiler.

The invention also relates to a motor vehicle with the above-described front structure. The motor vehicle may have a higher supporting plane of the front structure in the vertical direction in the case of a collision with a pedestrian due to the arching of the front section of the front spoiler, which results in improved pedestrian protection.

Further features and advantages of the invention will become clear using the following description of one embodiment with reference to the appended drawings.

DETAILED DESCRIPTION

Figure 1:
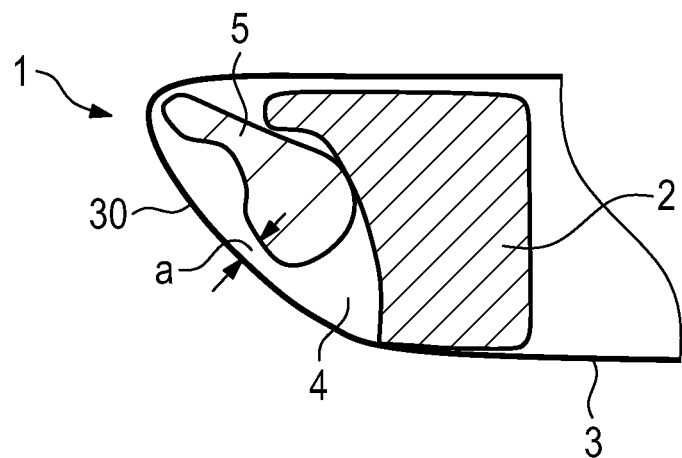
FIG. 1 shows a diagrammatically greatly simplified illustration of a front structure of a motor vehicle in accordance with a first embodiment of the invention, before a collision event with a pedestrian.
Figure 2:
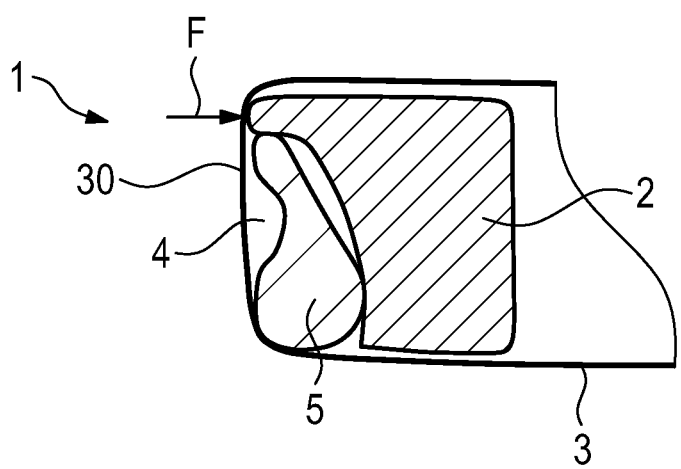
FIG. 2 shows a diagrammatically greatly simplified illustration of the front structure in accordance with FIG. 1 after the collision event.

With reference to FIGS. 1 and 2, a first exemplary embodiment of a front structure 1 of a motor vehicle comprises a supporting crossmember 2 and a front spoiler 3 that extend in the transverse direction of the motor vehicle. The front spoiler 3 has a front section 30 that extends to the outside from the supporting crossmember 2 and is shaped to form a covering for the supporting crossmember 2. An intermediate space 4 is configured between the front section 30 of the front spoiler 3 and the supporting crossmember 2, and a deformation means 5 is accommodated in the intermediate space 4.

FIG. 1 shows the front structure 1 before a collision event with a pedestrian. The front section 30 of the front spoiler 3 is configured so that, in the case of a pedestrian impact, an outer force (symbolized by an arrow F in FIG. 2) acts on the front structure 1 and arches the front structure 1 down in the vertical direction due to an interaction with the deformation means 5 that moves within the intermediate space 4 in the case of the pedestrian impact. The arching of the front section 30 of the front spoiler 3 is shown in FIG. 2 and has the consequence that the front structure 1 has a higher supporting plane in the vertical direction as a result of the arched front section 30. This higher supporting plane contributes to improved pedestrian protection.

The contour of the deformation means 5 preferably is adapted to the contour of the front section 30 in such a way to minimize spacing "a" in FIG. 1 between the front section 30 and the deformation means 5. It is particularly advantageous in this context if the deformation means 5 bears directly against an inner side of the front section 30 of the front spoiler 3 in said region, with the result that the spacing is a=0.

Tests carried out with a legform impactor that simulates the pedestrian impact have shown that it is expedient to adapt the outer contours of the supporting crossmember 2 and the deformation means 5 to correspond with one another, in particular, in those sections where they interact with one another by way of a support of the deformation means 5 on the supporting crossmember 2 in a pedestrian impact, and preferably are formed in a complementary manner with respect to one another at least in sections. The adaptation of the outer contours of the supporting crossmember 2 and the deformation means 5 achieves a situation where the ratio of the deformation of the front section 30 in the vehicle longitudinal direction (x-direction) to the widening in the vehicle vertical direction (z-direction) can be improved.

Figure 3:
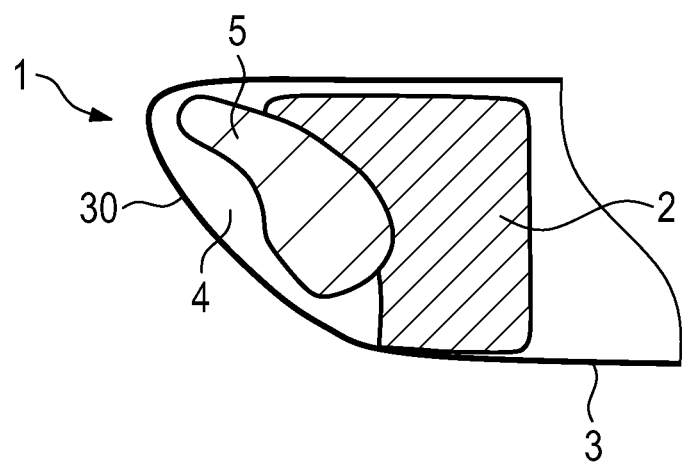
FIG. 3 shows a diagrammatically greatly simplified illustration of a front structure of a motor vehicle in accordance with a second embodiment of the invention, before a collision event with a pedestrian.
Figure 4:
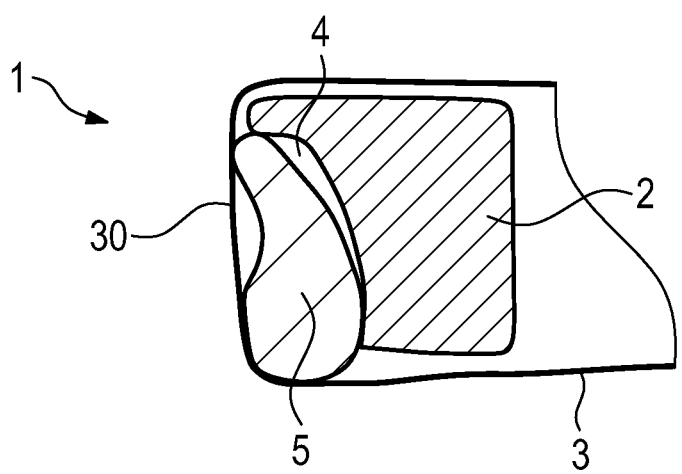
FIG. 4 shows a diagrammatically greatly simplified illustration of the front structure of FIG. 3 after the collision event.

FIGS. 3 and 4 show a front structure 1 configured in accordance with a second embodiment of the invention. The fundamental structural construction corresponds to that of the first embodiment, and thus reference is to be made in this regard to the above explanations. FIG. 3 shows the front structure 1 before a pedestrian impact and illustrates that the outer contour of the deformation means 5 is adapted in sections to the outer contour of the supporting crossmember 2. This achieves a situation where the deformation means 5 bears in sections directly against the supporting crossmember 2 in its non-activated position and is supported on the outer contour of the supporting crossmember 2. In the case of a pedestrian impact (as can be seen in FIG. 4), the front section 30 again is arched in the vehicle vertical direction (z-direction) as a result of interaction with the deformation means 5 that moves during the collision and is supported on the supporting crossmember 2. As a result, a supporting plane of the front structure 1 is higher overall and can obtain an improved the pedestrian protection.

Figure 5:
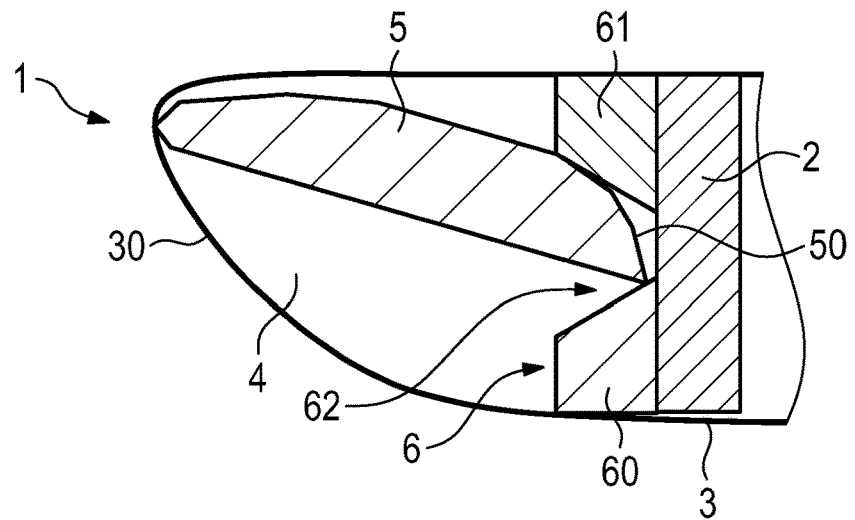
FIG. 5 shows a diagrammatically greatly simplified illustration of a front structure of a motor vehicle in accordance with a third embodiment of the invention, before a collision event with a pedestrian.
Figure 6:
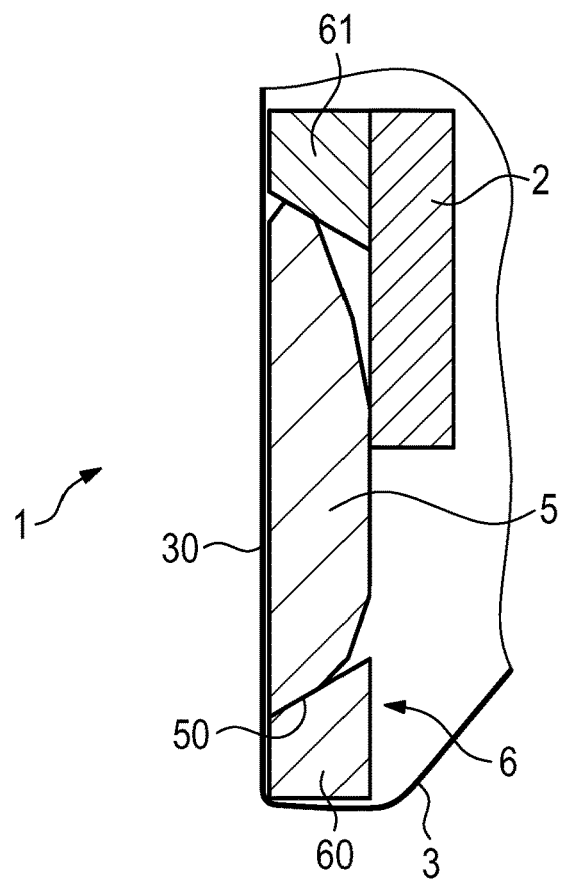
FIG. 6 shows a diagrammatically greatly simplified illustration of the front structure of FIG. 5 after the collision event.

FIGS. 5 and 6 illustrate a front structure 1 of a motor vehicle in accordance with a third embodiment. In this third embodiment, a holding device 6 is arranged between the supporting crossmember 2 and the front section 30 of the front spoiler 3. The holding device 6 is configured to hold an end 50 of the deformation means 5 so that the end 50 of the deformation means 5 faces the supporting crossmember 2. The holding device 6 has a first holding element 60 and a second holding element 61 that are spaced apart from one another in the vehicle vertical direction and between which a receiving space 62 is configured for receiving the end 50 of the deformation means 5 that faces the supporting crossmember 2.

FIG. 5 shows that the two holding elements 60, 61 are formed so that the receiving space 62 tapers in the direction of the supporting crossmember 2 to achieve improved retention and improved guidance of the deformation means 5 in the case of a collision with a pedestrian. The first holding element 60 is fastened on the inside to the front section 30 of the front spoiler 3. The second holding element 61 is fastened to the supporting crossmember 2 and also is fastened on the inside to the front section 30 of the front spoiler 3. As an alternative, the second holding element 61 can be fastened only on the inner side to the front section 30 of the front spoiler 3.

The region of the outer contour of the deformation means 5 that faces the supporting crossmember 2 in the case of a pedestrian collision is convex, and the region of the deformation means 5 that faces the front section 30 of the front spoiler 3 after the pedestrian collision is substantially planar.

In the case of a pedestrian collision, the deformation means 5 turns to face the receiving space 62 of the holding device 6 and in the process presses the first holding element 60 down in the vehicle vertical direction (z-direction). Thus, as shown in FIG. 6, the front section 30 of the front spoiler 3 arches in the vehicle vertical direction, and bears with the inner side of the front section 30 against the deformation means 5. As a result, an overall higher supporting plane of the front structure 1 in the vehicle vertical direction can be obtained for improved pedestrian protection.

Figure 7:
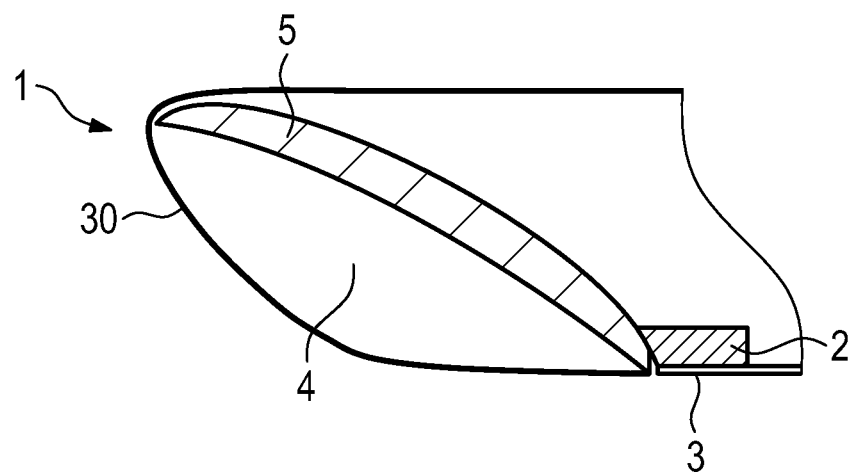
FIG. 7 shows a diagrammatically greatly simplified illustration of a front structure of a motor vehicle in accordance with a fourth embodiment of the invention, before a collision event with a pedestrian.
Figure 8:
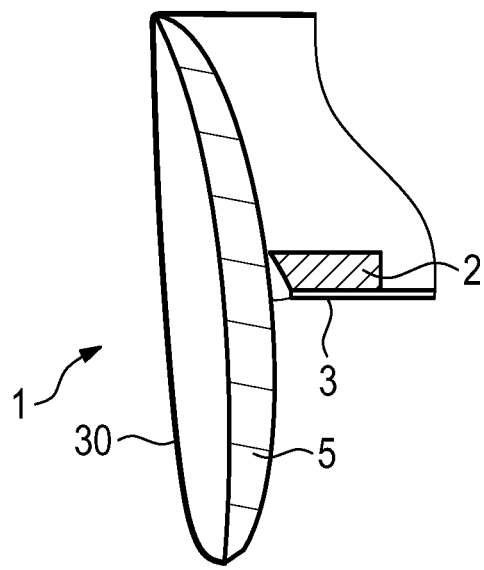
FIG. 8 shows a diagrammatically greatly simplified illustration of the front structure of FIG. 7 after the collision event.

FIGS. 7 and 8 show a front structure 1 of a motor vehicle in accordance with a fourth embodiment. The outer contour of the deformation means 5 that faces the supporting crossmember 2 in the case of a pedestrian collision once again is convex. The supporting crossmember 2 has a more compact configuration in the fourth embodiment than in the other embodiments and has a lower profile with a concave shape in sections that face the deformation means 5 in the case of a pedestrian collision. These shapes achieve a situation where the deformation means 5 can turn in the case of the collision with a pedestrian, and can subsequently assume the upright position shown in FIG. 8. The front section can once again arch in the vehicle vertical direction (z-direction) as a result of the interaction with the deformation means 5, which turns in during the collision. As a result, an overall higher supporting plane of the front structure 1 in the vertical direction can be obtained for improved pedestrian protection.

Figure 9:
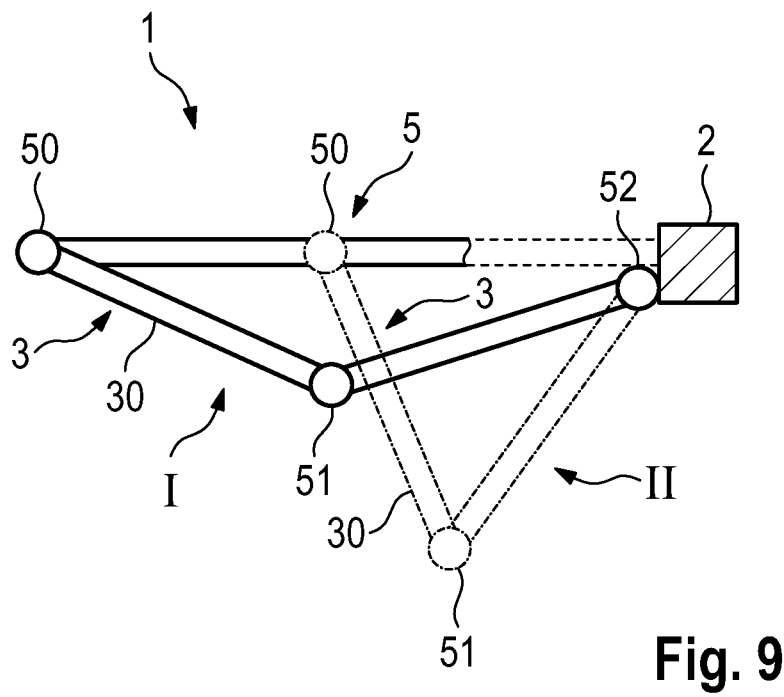
FIG. 9 shows a diagrammatically greatly simplified illustration of a front structure of a motor vehicle in accordance with a fifth embodiment of the invention.

FIG. 9 illustrates a front structure 9 in accordance with a fifth embodiment both before and after a collision with a pedestrian. The deformation means 5 of FIG. 9 comprises a first joint 50, a second joint 51 and a third joint 52 that are integral with the front spoiler 3. The joints 50, 51, 52 form an articulated structure.

The three joints 50, 51, 52 bring it about that the front section 30 of the front spoiler 3 arches down in the vertical direction and out of the position that is denoted by I into the position denoted by II in the case of a pedestrian impact where the front spoiler 3 comes into contact with the supporting crossmember 2.

Figure 10:
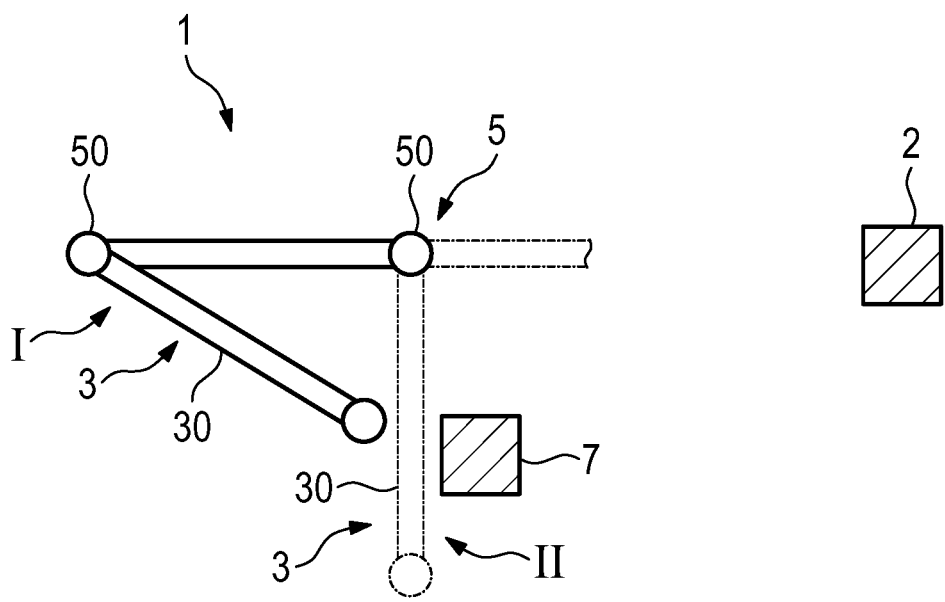
FIG. 10 shows a diagrammatically greatly simplified illustration of a front structure of a motor vehicle in accordance with a sixth embodiment of the invention.

FIG. 10 illustrates a front structure 1 in accordance with a sixth embodiment before and after a collision with a pedestrian. The sixth embodiment has a deformation means 5 formed by a single joint 50 that is integral with the front spoiler 3 and is arranged at a front end of the front spoiler 3. A further stop element 7 is provided in addition to the supporting crossmember 2. Thus, the front section 30 of the front spoiler 3 pivots in the case of a pedestrian impact. Accordingly, the front spoiler 3 comes into contact with the supporting crossmember 2 and with the stop element 7, in such a way that the front section 30 arches down in the vertical direction out of the position that is denoted by I into the position that is noted by II.

What is claimed is:

1. A front structure of a motor vehicle, comprising
   at least one supporting crossmember and a front spoiler that extend in the transverse direction of the motor vehicle, the front spoiler having a front section that extends outward of the supporting crossmember, and
   a deformation means arranged in an intermediate space between the supporting crossmember and the front spoiler, the deformation means having opposite upper and lower ends that are movable with respect to the supporting crossmember and the front spoiler in both a front-rear direction of the motor vehicle and a vertical direction, wherein
   the front section of the front spoiler and the deformation means are configured so that, in the case of a pedestrian collision, the front section is arched by the deformation means with respect to the supporting crossmember.

2. The front structure of claim 1, wherein the supporting crossmember has a concave outer contour facing toward the deformation means and the deformation means has a convex outer contours facing toward the supporting crossmember, the concave outer contour and the convex outer contour being formed so that they correspond with one another in those sections in which they interact with one another by way of a support of the deformation means in the case of a pedestrian impact.

3. The front structure of claim 2, wherein the outer contours of the supporting crossmember and the deformation means are complementary with respect to one another at least in those sections in which they interact with one another in the case of a pedestrian impact.

4. The front structure of claim 2, wherein the deformation means has a concave region facing away from the supporting cross member.

5. The motor vehicle having the front structure of claim 1.

6. A front structure of a motor vehicle, comprising
   at least one supporting crossmember and a front spoiler that extend in the transverse direction of the motor vehicle, the front spoiler having a front section that extends outward of the supporting crossmember, and
   at least one deformation means arranged in an intermediate space between the supporting crossmember and the front spoiler or is integral with the front spoiler, wherein
   the front section of the front spoiler and the deformation means are configured so that, in the case of a pedestrian collision, the front section is arched by the deformation means that is supported on the supporting crossmember, wherein the front structure has a holding device arranged between the supporting crossmember and the front section of the front spoiler, and is configured to hold an end of the deformation means facing the supporting crossmember.

7. The front structure of claim 6, wherein the holding device has a first holding element and a second holding element that are spaced apart from one another in a vehicle vertical direction and between which a receiving space being formed between the first holding element and a second holding element for receiving an end of the deformation means that faces the supporting crossmember.

8. The front structure of claim 7, wherein the first and second holding elements are formed so that the receiving space tapers toward the supporting crossmember.

9. The front structure of claim 6, wherein a region of the deformation means that faces the front section of the front spoiler after the pedestrian impacts comprises a substantially planar surface.

10. The front structure of claim 9, wherein the deformation means has a convex surface facing oppositely from the substantially planar surface thereof.

11. A motor vehicle having the front structure of claim 6.

12. The front structure of claim 6, wherein the second holding element is movable in the vertical direction away from the first holding element in response to in response to forces generated in the case of a pedestrian collision.

* * * * *